United States Patent [19]

Brutsch et al.

[11] 4,017,965
[45] Apr. 19, 1977

[54] METHOD OF MAKING A TRANSDUCER HEAD WITH NARROW CORE STRUCTURE

[75] Inventors: Werner Brutsch, Garberville; Michael Isaac Behr, South Pasadena; Ko Ko Gyi, Thousand Oaks, all of Calif.

[73] Assignee: Burroughs Corporation, Detroit, Mich.

[22] Filed: June 16, 1975

[21] Appl. No.: 587,429

[52] U.S. Cl. .................... 29/603; 219/121 LM; 360/103; 360/121; 360/122
[51] Int. Cl.² ........................................... G11B 5/42
[58] Field of Search ............ 29/603; 219/121 LM; 360/103, 119, 121, 122

[56] References Cited
UNITED STATES PATENTS

| 3,440,360 | 4/1969 | Sugaya ........................... 29/603 |
|---|---|---|
| 3,514,851 | 6/1970 | Perkins et al. ..................... 29/603 |
| 3,621,153 | 11/1971 | Wenner ............................. 29/603 |
| 3,735,052 | 5/1973 | Hoogendoorn et al. ............. 29/603 |
| 3,750,274 | 8/1973 | Bealle et al. ...................... 29/603 |
| 3,922,776 | 12/1975 | Alger et al. ....................... 29/603 |

*Primary Examiner*—Carl E. Hall
*Attorney, Agent, or Firm*—Nathan Cass; Kevin R. Peterson; Edward J. Feeney, Jr.

[57] ABSTRACT

In the manufacture of a transducer head, a plurality of elongated slots are formed in a non-magnetic substrate to receive magnetic cores having a transducing gap. A sealing composition bonds the cores in the slots and the cores are then laser trimmed to predetermined widths and at predetermined core-to-core spacings.

16 Claims, 2 Drawing Figures

METHOD OF MAKING A TRANSDUCER HEAD WITH NARROW CORE STRUCTURE

RELATED PATENT

U.S. Pat. No. 3,621,153, issued Nov. 16, 1971, to John W. Wenner, discloses a magnetic transducer head and a method for producing partial gaps in the transducer cores by means of laser beam energy.

BACKGROUND OF THE INVENTION

1. Field of the Invention

The invention relates generally to magnetic head assemblies, and more particularly to narrow magnetic transducing cores for use in a head shoe of the type used in magnetic recording systems and improved means for manufacturing such cores.

The invention is based on the realization that as regards read/write heads used in computer peripherals such as data acquisition, data storage, data retrieval and others to record statistical or other information on magnetic tapes, disks or drums, the heads may be provided with a plurality of closely spaced, parallel channels or cores each including a core gap, and the narrower the cores, the higher the track density per inch on the recording medium.

2. Description of the Prior Art

In magnetic storage systems, a transducer head is mounted over a moving recording medium, such as a magnetic drum, disk or tape, at a small distance from the surface of the medium. The head carries a plurality of magnetic read/write cores, generally parallel to the surface of the medium, each sensing the magnetic condition of one or a plurality of discrete data tracks on the medium as the surface passes beneath the head. With the need for high density and high frequency recording, the dimensions of the transducing cores and gaps have been made progressively smaller. Due to inadequate manufacturing methods in the past associated with such multicore heads, high yield production of the head assembly has been difficult to attain because of the need for fine positioning of the delicate cores in the head shoe and because of the criticalness of the gap dimensions.

One known technique for producing narrow head cores is to initially bond a pair of discrete core bars together and form the same into a "sandwich" which, subsequently, is sliced down to a desired core width, the appropriate read/write gap being formed during the bonding process of the bars. This method is used extensively for core widths down to about 3 mils.

However, the production of transducer cores thinner than three mils is considerably more difficult. One known method, for example, is to lap down a thicker core to a desired width, for example from 5 mils to 1 mil. The inherent disadvantage involved here is that such cores are extremely fragile and hard to handle, e.g. during positioning of these cores in the shoe apertures, and during attachment of the back plate onto the magnetic structure or during winding of the magnetic coils onto the core pieces.

Also known are apertured magnetic transducer cores in which the aperture or slot constitutes a magnetic gap cut only part way across the magnetic material. An example of such a system is illustrated and described in the aforementioned U.S. Pat. No. 3,621,153. The referenced patent discloses a structure utilizing individual bands of magnetic material which are wound with a coil and then individually wrapped around an edge of a non-magnetic support substrate. Magnetic gaps are sequentially cut in the individual bands by means of a laser source, the gaps having a width less then the width of the bands such that a portion of the bands bridges each longitudinal end of the gap. The gaps being cut are compared to a standard or reference and the cut is then controlled to produce heads having both uniform electrical characteristics and physical alignment.

A typical embodiment disclosed in the referenced patent comprises a band of high-permeability magnetic material having a width of 0.040 inch and a gap cut therein with a width of 0.038 inch and a length of 0.002 to 0.003 inch. The band portions bridging the longitudinal ends of the gaps, in this configuration, each are 0.001 inch, the bridging band portions serving to provide mechanical strength for the core structure.

One inherent disadvantage encountered with the magnetic head taught by Wenner, supra, is that within their relative dimensions, the cores do not enable the core gaps to be substantially enlarged or reduced in width for reasons that in extending the gap width, the mechanical strength required for this type of core structure would be substantially reduced. On the other hand, in reducing the gap width, the effective magnetic intensity in the gap area would proportionally be lowered due to the continuity across the resulting, enlarged bridging portions of the band.

A further disadvantage of the core structure under discussion lies in the fact that each longitudinal end of the gap defines unavoidable radii which, however small, impair the flux intensity and, hence, the magnetic response at such ends.

A further limitation of Wenner, supra, is that in the system taught, laser cutting of the magnetic material cannot effect narrow cores with very fine core gaps having good gap definitions. It should be noted that, for example, for the recording above 4000 BPI, a narrow gap having a width of about $50 \mu'' - 100 \mu''$ is required. Typically, laser cuts as for example applied in Wenner, supra, are much greater than $500 \mu''$.

Moreover, given the configuration and width dimensions of both the cores and core gaps of Wenner, use of the system precludes recording of media having a high track density of, for example, 800 tpi or more. As a result, the head assembly of Wenner does not, of necessity, require close, equidistant spacings between the respective center lines of the cores.

SUMMARY OF THE INVENTION

The main object of the invention is to overcome the above disadvantages by providing a magnetic head assembly incorporating substantially narrow cores of 1 mil or less and very fine core gaps of, for example, 100 $\mu''$ or less having good gap definitions to provide a high resolution response.

A further object of the invention is to provide an improved method of manufacturing such magnetic head assemblies with close, equidistant spacings between the respective cores in a head shoe to enable high track density recording.

A further object of the invention is to provide means for substantially reducing the width of the cores within accurate dimensions to the order of $100\mu'' - 50 \mu''$.

These and other objects of the invention are achieved by providing a non-magnetic substrate with a plurality of equally spaced, parallel, elongated apertures or core slots in which corresponding configured magnetic cores are bonded in precise or nearly precise alignment by means of a bonding agent. The slots are first formed in the substrate by die stamping or chemical etching. The cores, in essence, each comprise two core halves defining opposing pole faces separated from one another by a predetermined distance and constituting a transverse core gap between the two halves, the latter being interconnected by a non-magnetic gap bonding material. Following bonding or sealing of the cores in their respective slots in the substrate, portions of the core are removed to a predetermined depth by means of a laser source until a predetermined, critical width of the core is obtained. Typically, the core portions directly neighboring the core gap at the surface of the substrate, which glides over the storage medium, are reduced from 5 mils to 1 — 0.5 mil. Trimming of the cores is done sequentially and in a manner such that the center lines of consecutive cores are disposed a predetermined, equal distance from one another and such that cores having center lines deviating from the predetermined distance, will be trimmed more extensively on one side than on the oppposite side. To complete the assembly, the cores and surrounding substrate material are abrasively ground or lapped to provide as flush a surface as possible.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The following procedure produces a magnetic head assembly, sometimes referred to as a head shoe, of the type presently used as a non-contact magnetic pick-up or transducer. For example, when used in connection with a magnetic storage disk, the assembly is typically flexure-supported on the end of an actuator which selectively positions the head assembly in relation to the disk and maintains the assembly at a predetermined optimum "flying" height just above the disk surface. As the disk rotates continuously, supporting air pressure is built up and maintained by aerodynamic flow beneath the assembly to form an air bearing. The adjacent side of the assembly is therefore called a "bearing surface".

Figure 1:
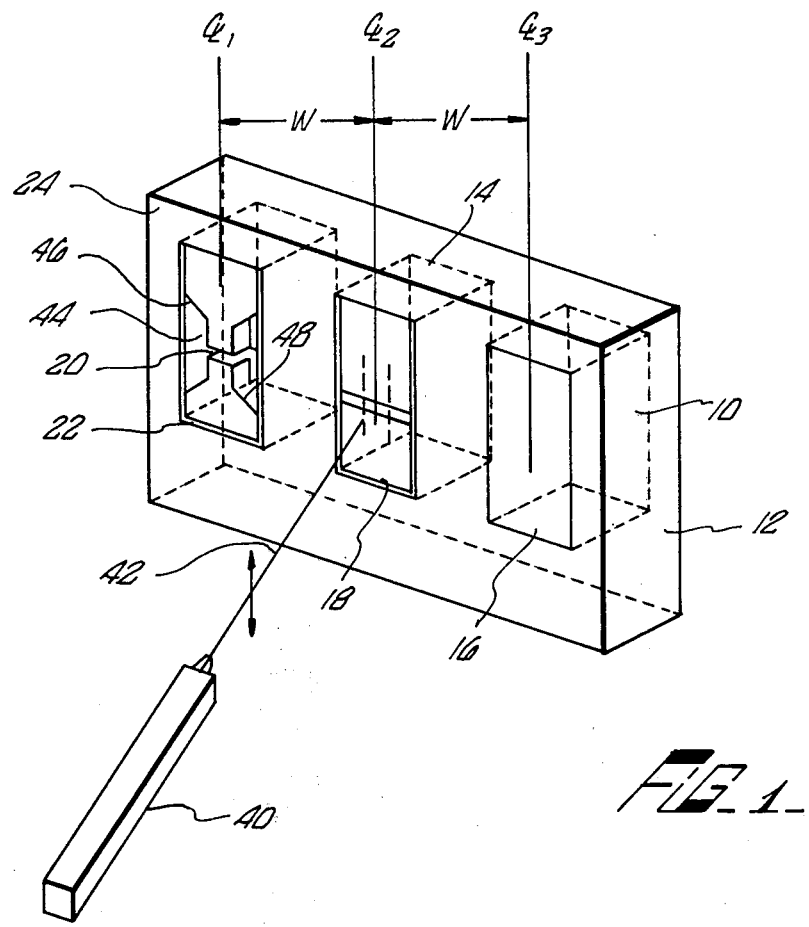
FIG. 1 is an isometric view of a multicore transducer head being constructed in accordance with the teachings of the present invention and showing apparatus by which the method of the present invention may be practiced.

Exemplary shown in FIG. 1 are three oblong, generally rectangular apertures 10 which are first formed by die stamping or chemical etching through a non-magnetic substrate or slider 12 which is ordinarily a rectangular slab of bariom titanate or Photoceram (Trademark), having a coefficient of thermal expansion closely matching that of the core which the substrate 12 will support. The apertures 10, as shown, are spacedly formed in the substrate 12 such that their center lines, $CL_1$, $CL_2$, $CL_3$, respectively, extend at equal, predetermined distances W relative to each other. As can be seen, also the upper and lower inner surfaces 14, 16, respectively, of the three parallel apertures 10 extend in substantially accurate longitudinal alignment.

Thin, flat magnetic cores 18, typically ferrite, NiZn or MnZn, are inserted in the apertures 10. The apertures have a depth substantially equal to the thickness of the core; however, at least the width of the cores is smaller than such peripheral dimensions of the apertures so as to provide adequate initial positioning space for the cores in the apertures. Typically, the width of the apertures is about 10 mils while the width of the core material is approximately 4.3 — 5 mils. Since the apertures 10 are not completely filled with the cores, vacant peripheral portions between the cores and apertures are filled with a bonding composition to seal the cores rigidly in the substrate. Typically, the bonding material may be glass or epoxy, however epoxy is preferred on account of its compatible thermal expansion coefficient. The preferred technique is to fill the remaining vacant portions powdered epoxy material which has a melting point below that of the glass in the core gaps 20; the glass construction in the core gaps will hereinafter be more fully explained with reference to the core structure shown in FIG. 2. Following depositing of the bonding agent, the entire assembly is then heated to a temperature between the two melting points, at which point the sealing material melts and flows to fill the formerly vacant portions of the apertures 10. After cooling, the sealing material solidifies bonding the cores 18 in place, as shown in FIG. 1, in which the reference numeral 22 indexes the solidified sealing material.

To complete this part of the assembly, portions of the cores 18 extending beyond the bearing surface 24 are removed by abrasive grinding or lapping. In the lapping process portions of the cores and adjacent bearing surface are removed to obtain a desired overall flat surface configuration.

Figure 2:
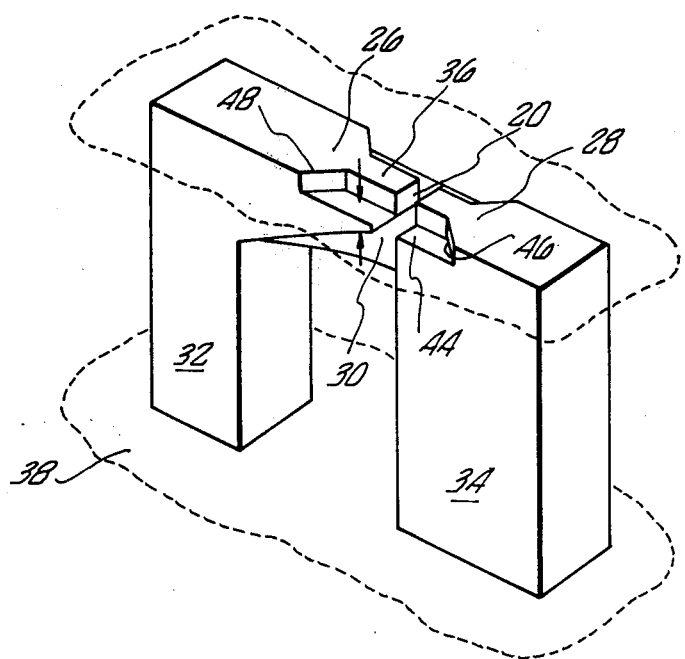
FIG. 2 is an isometric view of a magnetic core structure constructed in accordance with the invention.

The core 18, as viewed in FIG. 2, includes a generally L-shaped portion 26 and a bar or I-shaped portion 28. The lapped core portions 26, 28 are cemented together with a bonding glass 30 to form a U-shaped core. The transducing gap 20 is formed by the cemented junction of portions 26 and 28. The height, $h$, of the gap 20 in the head assembly is termed the "throat height" and is a critical dimension in determining the magnetic response of the cores 18.

Typically, the legs 32, 34 of the U-shaped core extend through the substrate 12 with the base 36, including the core gap 20, terminating proximate and somewhat beyond the bearing surface 24.

The ends of the legs of the core 18 typically extend beyond the slider's upper surface 38 (shown in reverse in FIG. 2) and, in practice, are bridged by a magnetic backbar or sidebar (not shown) supported by a flexure or spring element of the actuator (not shown) to which the assembly is attached. The backbars carry the read/write coil wires and complete the magnetic circuit for the cores 18. The aforementioned core material, as will be appreciated, is a high-permeability magnetic material.

Following the step of abrasive grinding the projecting core portions and adjacent bearing surface, the next step in the process of manufacture is trimming the core widths from a given width, typically 4.3 — 5 mils, to a predetermined desired width of 0.5 — 1 mil, in some applications to a width well below 0.5 mil. Assuming an initial width of 4.3 mils, the cores, accordingly, will have to be reduced in width by 3.3 mils or more. Reduction of the core widths, typically, is effected in those areas approximately in the middle of the core apertures 10 at the bearing surface 24, in the area where the core gaps 20 are located.

It should be noted that with cores having a width of 1 mil or less, the recording medium may be designed with a tpi of 800 or more, this, of course, depending upon the spacing between the individual cores.

To provide the desired core widths, portions of the cores in the aforementioned gap area are removed by means of beam energy focused onto the designated regions. Typically, the beam energy is in the form of a laser source 40 whose laser beam is identified by the line 42. The released portions of the core mass form generally trench-shaped slots or recesses 44 which extend in parallelism to the longitudinal axis of the core apertures, adjacent each side of the throat height.

The recesses 44 as particularly shown in FIG. 2, define skewed longitudinal ends 46, 48, typically oriented at 45°, which serve to prevent the gap 20 from picking up long wavelength signals. In case the recesses 44 were configured with rectangular ends instead of skewed ends, such ends would inherently act as second gaps and pick up undesirable secondary noise.

Beam energy, for example, in the form of light, laser or electron beams has the advantage that it can be controllably proportioned and directed with considerable accuracy. Moreover, very high performance densities may be obtained with beam energy, so that, with extremely short period actions, the required treatment effects are thus obtainable only if required over closely defined surface regions and penetration depths.

Typically, the cores of the invention are produced by so-called laser trepanning in which the conventional X—Y stage under program control is applied. Alternatively, the fixed-stage method may be used in which the laser beam is deflected and in which program control is obtained by using an optical system.

When the beam energy of one and the same beam is to sequentially cut at several point of "treatment", it is typical for the laser control to be so arranged that the beam is focused automatically and sequentially at the successive treatment points along the so-called X—Y pattern till a recess of desired dimensions is obtained. Assuming an initial core width of 4.3mils, the recesses formed after cutting the core typically have approximate dimensions of 1.6 mil in width, 5 mils in length and 1 — 3 mils in height, and the core interconnecting the recesses at the bearing surface approximately 1 mil.

In those instances where the center line of a given core aperture deviates from the center line of its respective core due to inadvertent and unavoidable misalignment of the cores in the apertures on account of the extremely small, overall dimensions of the cores, the process is conducted so as to obviate such deviations between center lines by automatically setting the beam control to focus the beam at fixed treatment points at predetermined spacings along a longitudinal axis of the substrate, i.e., the spacing between two consecutive recesses and the spacing between two consecutive cores. Such control of focus and spacing between treatment points of the laser beam is known in the art and, therefore, it is unnecessary to describe the control processes involved herein in detail.

The following example further illustrates the process of the invention in a non-limitative manner:

EXAMPLE

A core of $NiZnOFe_2O_3$ of 5 mils in width was laser trepanned by a Pulsed Xenon Laser Resistor Trimmer disclosed in U.S. Pat. No. 3,555,451. The diameter of the laser beam bore was 0.025; the action period for the bore 0.3 m/sec; the acceleration voltage aproximately 2 KV; the beam output 180 watts; the spot size or effective cutting size 0.5 and an objective lens of 2. Following cutting, the recesses formed in the core were of the following dimensions: length 15 mils, depth 3 mils and the height 2 mils. The core mass bridging the recesses was 0.5 mil in width.

The use of the numerical control system associated with the laser to focus the beam at predetermined spacings and points of treatments, are also disclosed in the aforementioned U.S. patent.

The diameter of the energy beam may be changed after the recesses 42 have been produced. Such a measure, given by way of example, enables the recess to be first produced without difficulty with a high power density and then with reduced power density in which no longer any material reduction occurs, however which measure serves to harden, smooth or anneal the recess.

Although in the arrangement shown a laser beam is used as the load carrier beam, it will be appreciated that, for example, a pulsed electron beam may equally well be adapted to carry out the trimming process of the invention.

To complete the process of manufacture, the bearing surface 24 is again subjected to abrasive grinding or lapping to remove any residue resulting from the laser trimming step from the bearing surface.

One of the advantages of the invention is that a higher yield is attainable in mass production since it is significantly easier to produce a narrow core width and desired equal spacing between the cores, as exemplary shown in FIG. 1, by means of laser trimming the core mass than by conventionally machining, abrasive grinding or lapping the initially wide cores to a reduced width, the latter being restricted to about 3 mils due to the inherent disadavantages involved in such prior art processes and due to the minute dimensions of the core structures per se.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A method of manufacturing a core for a magnetic transducer so as to provide a high density transducing capability, comprising the steps of:
   inserting a core having a gap into an aperture in a base of the transducer;
   filling remaining portions of said aperture with a bonding material;
   lapping the exposed surfaces of said core and bonding material to form a plane surface with the base;
   reducing the core gap width to approximately 0.5 mil by exposing the core material adjacent the gap to a laser beam of energy sufficient to remove the material; and
   relapping the exposed surfaces of said core and bonding material to form a plane surface with the base.

2. The method of claim 1, wherein said filling step includes filling vacant portions of said aperture with a powdered epoxy material having a compatible thermal expansion coefficient to that of the core material and then heating the resulting assembly to melt the powdered epoxy material so that it will flow and seal the core material in the aperture.

3. The method of claim 2, wherein said filling step includes filling said remaining portions of said aperture after said heating step with a glass bonding material.

4. The method of claim 1, wherein said reducing step includes removing core material so as to provide a throat height at least equal to the length of the gap.

5. The method of claim 1, wherein said reducing step includes removing core material adjacent the gap so as to provide a throat height at least equal to the length of the gap.

6. The method of claim 1, wherein said reducing step includes removing core material in closely defined surface areas on both sides of the gap to form spaced, parallel recesses therein defining a remaining, fine core portion therebetween not exceeding a width of 1 mil.

7. The method of claim 1, wherein said reducing step includes removing core material in closely defined surface regions to reduce the same to a fine, predetermined width not exceeding 1 mil, the reduced surface region constituting spaced, parallel slots each having a center line extending normal to the center line of the gap, each of said slots having longitudinal ends having a skewed orientation relative to the center lines of the slots.

8. The method of claim 7, wherein said reducing step further comprises forming said longitudinal ends with said skewed orientations extending at an angle of 45° relative to said center lines of said slots.

9. The method of claim 1, wherein said filling step includes filling said remaining portions of said aperture with an epoxy bonding material.

10. The method of claim 1, wherein said core is made of a ferrite material.

11. The method of claim 1, wherein said core is made of a ferrite material of the formula $NiZnOFe_2O_3$.

12. The method of claim 1, wherein said reducing step includes laser trepanning the core material on both sides of the gap.

13. The method of claim 1, wherein said reducing step includes laser trimming the core material on both sides of the gap to a predetermined width not exceeding 1 mil.

14. A method of manufacturing a narrow core for a magnetic transducer comprising the steps of:

inserting a core having a gap into an aperture in the base of the transducer;
filling remaining portions of said aperture with a bonding material;
lapping the exposed surfaces of said core and bonding material to form a plane surface with the base;
applying a laser beam to closely defined surface regions of the exposed core surface to reduce the same to a fine predetermined width, said energy being of an intensity sufficient to locally activate and remove portions of said regions to provide a pair of parallel recesses spaced apart and defining a remaining core portion therebetween in which said transducer gap is located, said remaining core portion having a width within the range of 0.5 — 1 mil; and
reapplying the step of lapping said exposed surfaces of said base to remove residue resulting from reducing the core.

15. A method of manufacturing a magnetic head assembly having narrow magnetic cores positioned in a base of the shoe of the head, the steps comprising:

forming at least one aperture in said base, said aperture including side walls lying in parallel planes spaced from each other a distance greater than the width of the core to be positioned in said aperture to provide vacant spaces between the core and said walls;
inserting a core having a gap into said aperture such that the gap extends transversely relative to said parallel planes of said walls, adjacent one surface of said base;
filling the remaining vacant portions of said aperture with a bonding material;
lapping said one surface of said base to provide a core area flush with said surface;
applying a laser beam to closely defined surface regions of said core material to reduce the same to a fine predetermined width, said laser beam being of an intensity sufficient to locally activate and remove portions of said regions to provide a pair of spaced, parallel recesses each having a center line extending parallel with said planes of said wall and defining a remaining core portion therebetween in which said transducer is located, said remaining core portion having a width within the range of 0.5 — 1 mil; and
reapplying the step of lapping said surface of said base to remove residue resulting from reducing said core material.

16. The method of claim 15, wherein the laser beam applying step includes laser trepanning of said closely defined surface regions.

* * * * *

UNITED STATES PATENT AND TRADEMARK OFFICE
CERTIFICATE OF CORRECTION

PATENT NO. : 4,017,965
DATED : April 19, 1977
INVENTOR(S) : Werner Brutsch et al.

It is certified that error appears in the above-identified patent and that said Letters Patent are hereby corrected as shown below:

Col. 2, line 4, change "then" to --than--;
      line 68, change "corresponding" to --correspondingly--.
Col. 3, line 8, delete "gap";
      line 35, change "ings" to --ing--;
      line 61, change "bariom" to --barium--.
Col. 4, line 19, between "portions" and "powdered", insert --with--.
Col. 5, line 41, change "point" to --points--.
Col. 6, line 6, change "0.025" to --.025"--;
      line 9, change "0.5" to --.5"--.
      change "2" to --2"--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*